United States Patent [19]
Jo

[11] Patent Number: 5,973,483
[45] Date of Patent: Oct. 26, 1999

[54] SWITCHING MODE POWER SUPPLY WITH OVER VOLTAGE STABILIZER

[75] Inventor: Sang-soo Jo, Kyungi-do, Rep. of Korea

[73] Assignee: SamSung Electronics Co., Ltd., Kyungki-do, Rep. of Korea

[21] Appl. No.: 09/059,394

[22] Filed: Apr. 14, 1998

[30] Foreign Application Priority Data

Apr. 14, 1997 [KR] Rep. of Korea .................. 97-7646

[51] Int. Cl.$^6$ .................................................. G05F 1/10
[52] U.S. Cl. ........................... 323/222; 323/285; 323/901
[58] Field of Search ................................. 323/222, 284, 323/285, 286, 901, 908

[56] References Cited

U.S. PATENT DOCUMENTS

| | | | |
|---|---|---|---|
| 4,323,957 | 4/1982 | Clark, Jr. et al. | 363/21 |
| 5,014,176 | 5/1991 | Kelleher, Jr. et al. | 363/56 |
| 5,023,542 | 6/1991 | Banura | 323/285 |
| 5,517,397 | 5/1996 | Quek et al. | 363/21 |
| 5,559,687 | 9/1996 | Nicollini et al. | 363/60 |

*Primary Examiner*—Shawn Riley
*Attorney, Agent, or Firm*—Robert E. Bushnell, Esq.

[57] ABSTRACT

A display device having a switching mode power supply which operates in boosting mode, said switching mode power supply includes a pulse width modulation circuit for outputting a switching control signal; an initial driver for providing a predetermined current for driving pulse width modulation circuit initially; a switching device for switching according to the signal from said pulse width modulation circuit; a switching transformer for transporting a voltage to second winding coil according to the status of said switching device; a feedback portion for dividing the voltage output from said switching transformer, and for feeding back divided voltage to said pulse width modulation circuit; an output portion for providing a high voltage induced by said switching transformer; and an over voltage stabilizing circuit, located between said feedback portion and said output portion, for compensating for the change of output voltage at an initial driving and at a load change.

20 Claims, 2 Drawing Sheets

SWITCHING MODE POWER SUPPLY WITH OVER VOLTAGE STABILIZER

This application makes reference to, incorporates the same herein, and claims all benefits accruing under 35 U.S.C. §119 from an application entitled SWITCHING MODE POWER SUPPLY WITH OVER VOLTAGE STABILIZER earlier filed in the Korean Industrial Property Office on Apr. 14, 1997, and there duly assigned Ser. No. 97-07646, a copy of which is annexed hereto.

FIELD OF THE INVENTION

The present invention relates to a switching mode power supply (SMPS) for controlling the power of an electronic appliance and more particularly, relates a switching mode power supply to with an over voltage protection function which protects an electronic appliance from over voltage by instantly stopping the pulse width modulation upon over voltage which can be by various events caused.

RELATED ART

A power supply used in a display generally employs a switching mode power supply for a color monitor, and employs a linear transformer for a monochrome monitor.

FIG. 1 is a detailed circuit diagram of a flyback switching mode power supply using the boost-up mode. A direct current (DC) voltage is boosted up to obtain a predetermined output voltage $V_{out}$. This configuration comprises a pulse width modulation (PWM) circuit 10 for outputting a switching control signal whose duty cycle is adjusted, an initial driver 11 for providing a predetermined current so that the pulse width modulation circuit is driven initially, a switching device Q1 for switching according to the output signal of the pulse width modulation circuit, a switching transformer T1 for charging or discharging energy according to the ON/OFF of switching device Q1, a feedback portion 12 for dividing the output voltage when switching transformer T1 discharges it and then feeds it back to the pulse width modulation circuit, and an output portion 13 for providing a high voltage vout induced by switching transformer T1.

The initial driver 11 has a driving resistor R1 for transmitting a DC voltage to the pulse width modulation circuit, and a diode D1 and smoothing capacitor C1 for rectifying and smoothing the voltage induced at the $L_s$ (secundary winding) of transformer T1 when the pulse width modulation circuit starts switching, and then providing the result to the pulse width modulation circuit.

Feedback portion 12 consists of a diode D2 for rectifying the discharged voltage of T1, and resistors R3 and R4 for detecting the rectified voltage and feeding it back to the pulse width modulation circuit. The output portion 13 is comprised of resistors R5 and R6 and capacitors C2 and for offering the output voltage vout provided via diode D2.

When a DC voltage is applied initially, a predetermined current for driving the pulse width modulation circuit runs to the Vcc terminal of PWM 10 via initial driving resistor R1. Then, the pulse width modulation circuit starts switching, and the voltage induced to the Ls (secundary winding) of transformer T1 is rectified through diode D1 and supplied to the Vcc terminal of the pulse width modulation circuit. This operation starts the pulse width modulation circuit's normal switching.

The drive output pulse of the pulse width modulation circuit is applied to the gate of Q1, and Q1 repeats its turn ON/OFF. The Q1's ON/OFF cycle is determined by the duty cycle of the pulse width modulation circuit output pulse.

When Q1 is turned ON, current flow through Q1 via Lp (primary winding) of transformer T1 so that energy is accumulated in Lp. This accumulated energy is rectified upon turning OFF of Q1, and then output to output portion 13.

The voltage applied across the resistor R4 of feedback 12 is fed back to the pulse width modulation circuit to control output voltage Vout. Output portion 13's resistors R5 and R6 are discharging resistors, and capacitors C2 and C3 are used for smoothing.

The aforementioned conventional switching mode power supply has a poor regulation of output voltage upon initial driving or abrupt change of load, because only the voltage across resistor R4 which is divided by resistors R3 and R4 is fed back to the pulse width modulation circuit.

SUMMARY OF THE INVENTION

Therefore, an objective of the present invention is to provide a switching mode power supply designed to improve its regulation which may become poor due to over voltage in accordance with the initial driving or load change in a boost-up switching power supply.

To accomplish the objective of the present invention, there is provided a boost-up switching mode power supply comprising: a pulse width modulation circuit for outputting a switching control signal; an initial driver for providing a predetermined current so that said pulse width modulation circuit is driven initially; a switching device for switching according to signal from said pulse width modulation circuit; a switching transformer for transporting to second winding coil according to the status of said switching device; a feedback portion for dividing an output voltage when said switching transformer discharges, and feeding back divided voltage to said pulse width modulation circuit; an output portion for providing a high voltage induced by said switching transformer to a behind stage; and an over voltage stabilizing circuit, located between said feedback portion and output portion, for compensating for the change of output voltage at the initial driving or at a load change. The present invention is more specifically described in the following paragraphs by reference to the drawings attached only by way of example. Other advantages and features will become apparent from the following description and from the claims.

BRIEF DESCRIPTION OF THE ATTACHED DRAWINGS

In the accompanying drawings, which are incorporated in and constitute a part of this specification, embodiments of the invention are illustrated, which together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 2:
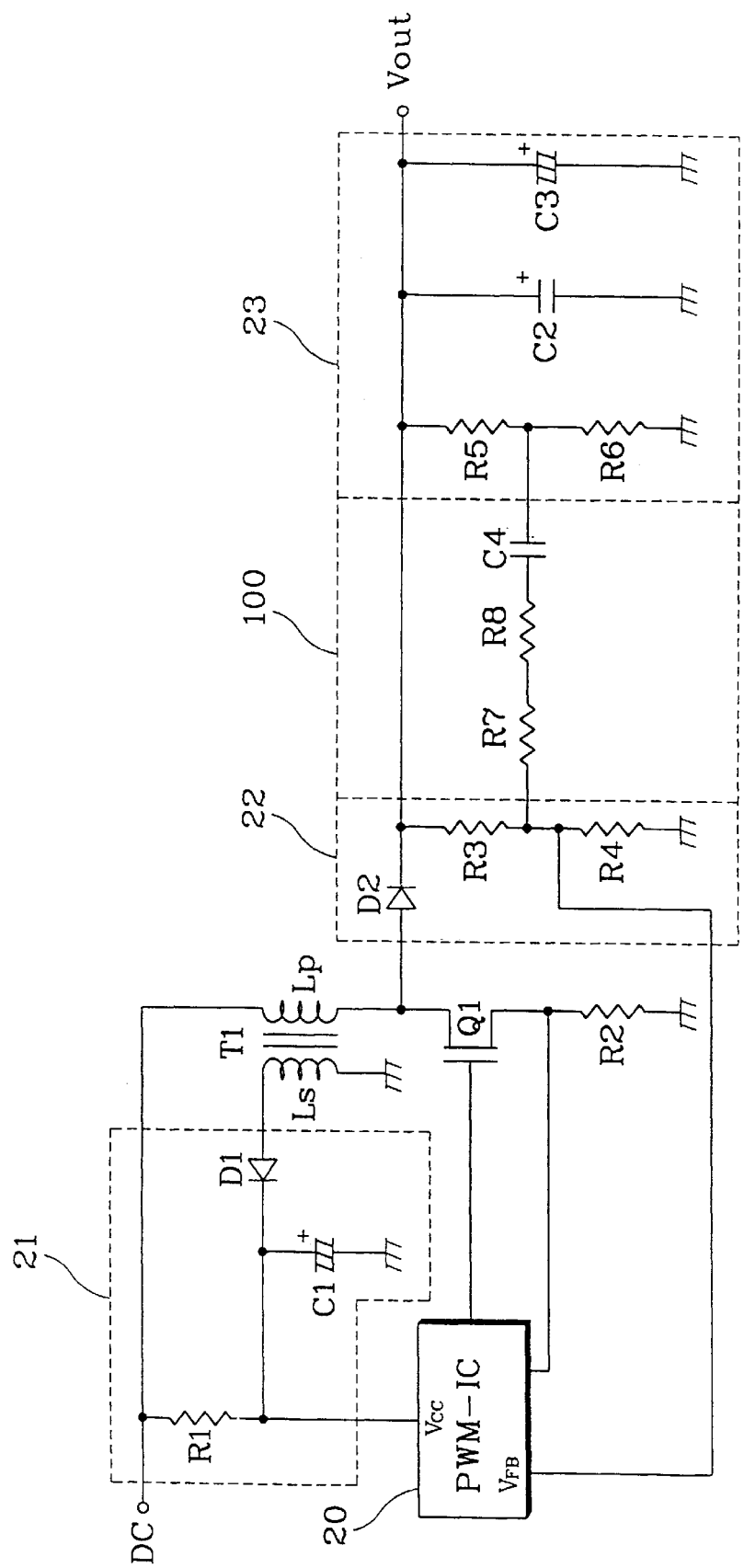
FIG. 2 is a circuit diagram of one embodiment of a power supply in accordance with the principles of the present invention.

Hereinafter, a preferred embodiment of the present invention will be described with reference to the attached drawings. FIG. 2 shows one embodiment of a switching mode power supply of the present invention, where by an over voltage stabilizing circuit 100 is placed between a feedback portion 22 and an output portion 23 for feeding back an error signal to the pulse width modulation circuit from the transformer T1 output stage.

Figure 1:
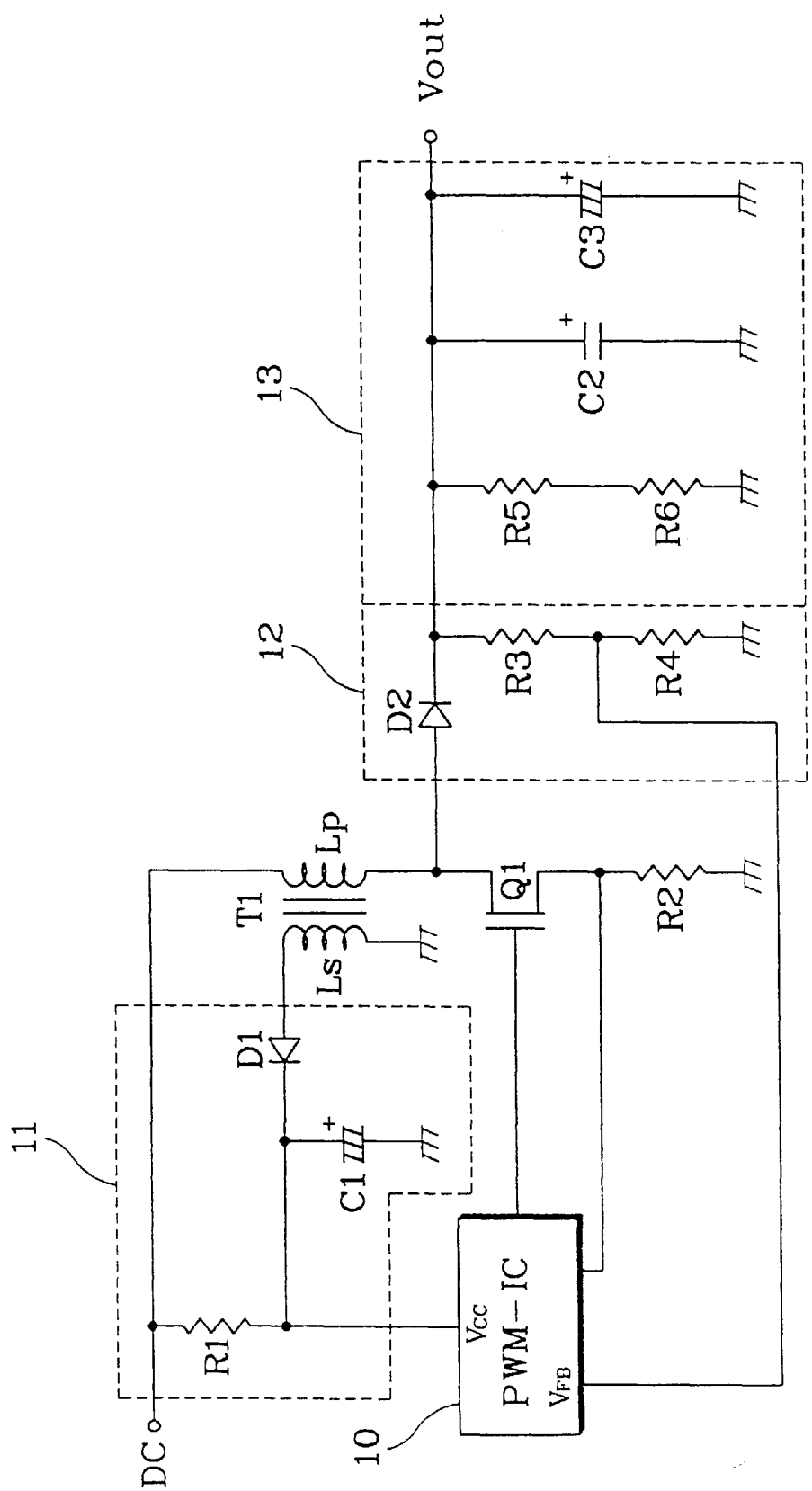
FIG. 1 is a circuit diagram of a boost-up power supply.

The over voltage stabilizing circuit 100 is located between resistors R3 and R4 forming the feedback portion 22, and resistors R5 and R6 forming the coupling portion. The components are resistors R7 and R8 in series, and blocking capacitor C4. One end of resistor R7 is connected to the node of resistors R3 and R4, and resistor R8 to the other end. The blocking capacitor C4 is located between the node of resistors R5 and R6, and resistor R8. The same components as those of FIG. 1, which shows a power supply, will not be explained herein.

The voltage rectified by diode D2 is divided by resistors R3 and R4, and the voltage applied across resistor R4 is fed back. Here, resistors R5 and R6 are for discharging so that capacitors C2 and C3 are used for smoothing of voltage Vout.

Located between the node of dividing resistors R3 and R4 and the node of discharging resistors R5 and R6, over voltage stabilizing circuit 100 quickly provides and feeds back the change of output voltage to the pulse width modulation circuit 20, enhancing the regulation.

The blocking capacitor C4 detects the divided output voltage via discharging resistors R5 and R6 of output portion 23, in order to block the DC component. Resistors R7 and R8 connected in series to the blocking capacitor C4 reduce, the changed alternating current (AC) voltage of the output voltage to an appropriate level. In other words, resistors R7 and R8 reduce the voltage which was divided by discharging resistors R5 and R6. The reduced result is sent to the pulse width modulation circuit's $V_{FB}$. Terminal As described above, the present invention enhances the voltage regulation by initially stabilizing the over voltage upon initial driving or abrupt load change in a flyback converter employing boost-up mode.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein. While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects in not limited to the specific details, representative apparatus and method, and illustrative examples shown and described. Accordingly, departures may be made from such details without departing from the spirit or scope of the applicant's general inventive concept.

What is claimed is:

1. An apparatus comprising:
   a display device conveying varying visual information to a user;
   a switching mode power supply unit being coupled to said display device and outputting a power to said display device, said switching mode power supply unit comprising:
      a pulse width modulation circuit outputting a switching control signal;
      an initial driver providing a predetermined current driving said pulse width modulation circuit initially;
      a switching device switching according to said switching control signal output from said pulse width modulation circuit;
      a switching transformer having a primary winding and a secondary winding, said transformer transferring a voltage to said secondary winding according to said switching of said switching device;
      a feedback portion dividing a first voltage received from said primary winding of said transformer to produce a first divided voltage, and feeding back said first divided voltage to said pulse width modulation circuit;
      an output portion having an output terminal coupled to said display device, said output portion being coupled to said feedback portion, said output portion providing an output voltage induced by said transformer to said output terminal, said output portion receiving said output voltage from said primary winding through said feedback portion; and
      an over voltage stabilizing circuit coupling said feedback portion to said output portion, compensating for changes in said output voltage at an initial driving, and compensating for changes in said output voltage at a load change.

2. The apparatus of claim 1, said over voltage stabilizing circuit detecting said changes in said output voltage by detecting corresponding changes in said second divided voltage.

3. The apparatus of claim 2, said over voltage stabilizing circuit further comprising:
   a capacitor blocking direct current and detecting said second divided voltage corresponding to said output voltage; and
   a plurality of resistors being coupled to said capacitor, reducing said changes in said second divided voltage corresponding to said changes in said output voltage, and conveying said changes in said second divided voltage to said feedback portion.

4. The apparatus of claim 1, said output portion further comprising a plurality of discharging resistors dividing said output voltage to produce a second divided voltage corresponding to said output voltage.

5. The apparatus of claim 1, said output portion not receiving said output voltage via said secondary winding.

6. The apparatus of claim 1, said output voltage corresponding to a voltage higher than a voltage of said direct current input power.

7. The apparatus of claim 1, said output portion receiving said output voltage from said over voltage stabilizing circuit, said over voltage stabilizing circuit receiving said output voltage from said feedback portion, said feedback portion receiving said output voltage from said primary winding of said transformer.

8. The apparatus of claim 1, said output portion further comprising a plurality of capacitors smoothing said output voltage.

9. The apparatus of claim 1, said primary winding of said transformer receiving a direct current input power.

10. The apparatus of claim 1, said switching device further comprising a transistor having a first control electrode connected to said pulse width modulation circuit, a first electrode of a principal electrically conducting channel connected to said primary winding, and a second electrode of said principal electrically conducting channel connected to a local reference potential.

11. An apparatus, comprising:
   a pulse width modulation circuit outputting a switching control signal;
   an initial driver providing a predetermined current driving said pulse width modulation circuit initially;
   a switching device switching according to said switching control signal output from said pulse width modulation circuit;
   a switching transformer having a primary winding and a secondary winding, said transformer transferring a voltage to said secondary winding according to said switching of said switching device;
   a feedback portion dividing a first voltage received from said primary winding of said transformer to produce a first divided voltage, and feeding back said first divided voltage to said pulse width modulation circuit;
   an output portion having an output terminal, said output portion being coupled to said feedback portion, said output portion providing an output voltage induced by said transformer to said output terminal, said output portion receiving said output voltage from said primary winding through said feedback portion; and
   an over voltage stabilizing circuit coupling said feedback portion to said output portion, compensating for changes in said output voltage at an initial driving, and compensating for changes in said output voltage at a load change.

12. The apparatus of claim 11, said output portion further comprising a plurality of discharging resistors dividing said output voltage to produce a second divided voltage corresponding to said output voltage.

13. The apparatus of claim 12, said over voltage stabilizing circuit detecting said changes in said output voltage by detecting corresponding changes in said second divided voltage.

14. The apparatus of claim 13, said over voltage stabilizing circuit further comprising:
   a capacitor blocking direct current and detecting said second divided voltage corresponding to said output voltage; and
   a plurality of resistors being coupled to said capacitor, reducing said changes in said second divided voltage corresponding to said changes in said output voltage, and conveying said changes in said second divided voltage to said feedback portion.

15. The apparatus of claim 14, said plurality of discharging resistors of said output portion including a first resistor having a first terminal connected to said output terminal and a second terminal connected to said over voltage stabilizing circuit, and said capacitor having a first terminal connected to said second terminal of said first resistor and a second terminal connected to said plurality of resistors of said over voltage stabilizing circuit.

16. The apparatus of claim 15, said output portion receiving said output voltage from said over voltage stabilizing circuit, said over voltage stabilizing circuit receiving said output voltage from said feedback portion, said feedback portion receiving said output voltage from said primary winding of said transformer.

17. The apparatus of claim 15, said output portion further comprising a plurality of capacitors smoothing said output voltage.

18. The apparatus of claim 15, said switching device further comprising a transistor having a first control electrode connected to said pulse width modulation circuit, a first electrode of a principal electrically conducting channel connected to said primary winding, and a second electrode of said principal electrically conducting channel connected to a local reference potential.

19. An apparatus, comprising:
   a display device conveying varying visual information to a user;
   a power supply unit outputting a power to said display device, said power supply unit comprising:
      a control unit outputting a switching control signal;
      an initial driver providing a predetermined current driving said control unit initially;
      a switching unit switching according to said switching control signal output from said control unit;
      a switching transformer having a primary winding and a secondary winding, said transformer transferring a voltage to said secondary winding according to said switching of said switching unit;
      a feedback unit receiving a first voltage from said primary winding, said feedback unit conveying to said control unit a signal corresponding to said first voltage;
      an output unit having an output terminal coupled to said display device, said output unit being coupled to said feedback unit, said output unit providing an output voltage induced by said transformer to said output terminal, said output unit receiving said output voltage from said primary winding through said feedback unit;
      said output unit further comprising a plurality of discharging resistors dividing said output voltage to produce a divided voltage corresponding to said output voltage;
      an over voltage stabilizing circuit coupling said feedback unit to said output unit, compensating for changes in said output voltage at an initial driving, and compensating for changes in said output voltage at a load change, said over voltage stabilizing circuit detecting said changes in said output voltage by detecting corresponding changes in said divided voltage;
      said switching unit corresponding to a transistor having a first control electrode connected to said control unit, a first electrode of a principal electrically conducting channel connected to said primary winding, and a second electrode of said principal electrically conducting channel connected to a local reference potential; and
      said over voltage stabilizing circuit further comprising:
         a capacitor blocking direct current and detecting said divided voltage corresponding to said output voltage; and
         a plurality of resistors being coupled to said capacitor, reducing said changes in said divided voltage corresponding to said changes in said output voltage, and conveying said changes in said divided voltage to said feedback unit.

20. The apparatus of claim 19, said output unit receiving said output voltage from said over voltage stabilizing circuit, said over voltage stabilizing circuit receiving said output voltage from said feedback unit, said feedback unit receiving said output voltage from said primary winding of said transformer.

* * * * *